Feb. 17, 1959 J. M. McCULLEY 2,874,280
STEP-WAVE GENERATOR WITH MEANS TO ADJUST AND
MEASURE HEIGHT OF ANY STEP
Filed April 29, 1953 2 Sheets-Sheet 1
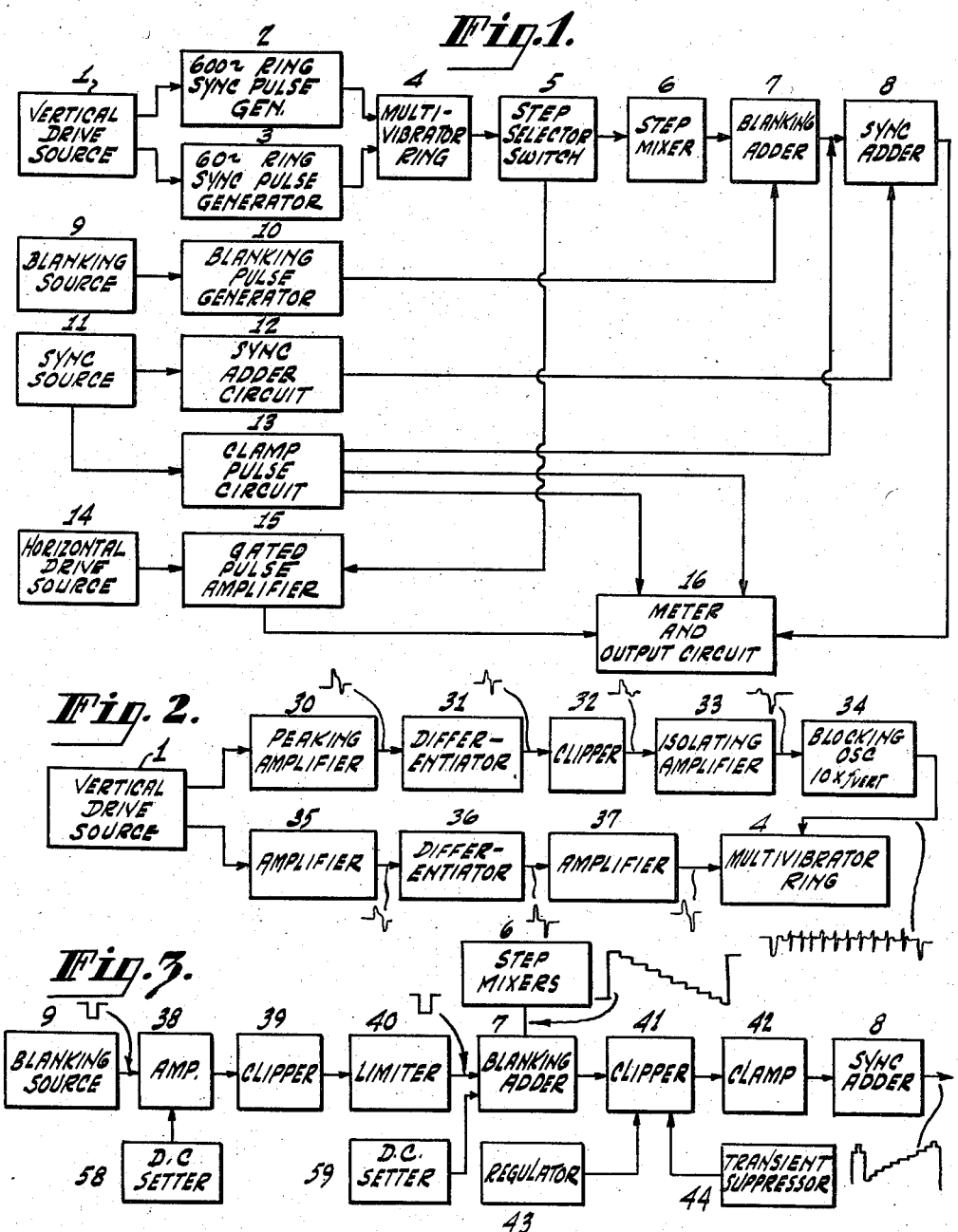
INVENTOR.
JAMES M. McCULLEY
ATTORNEY

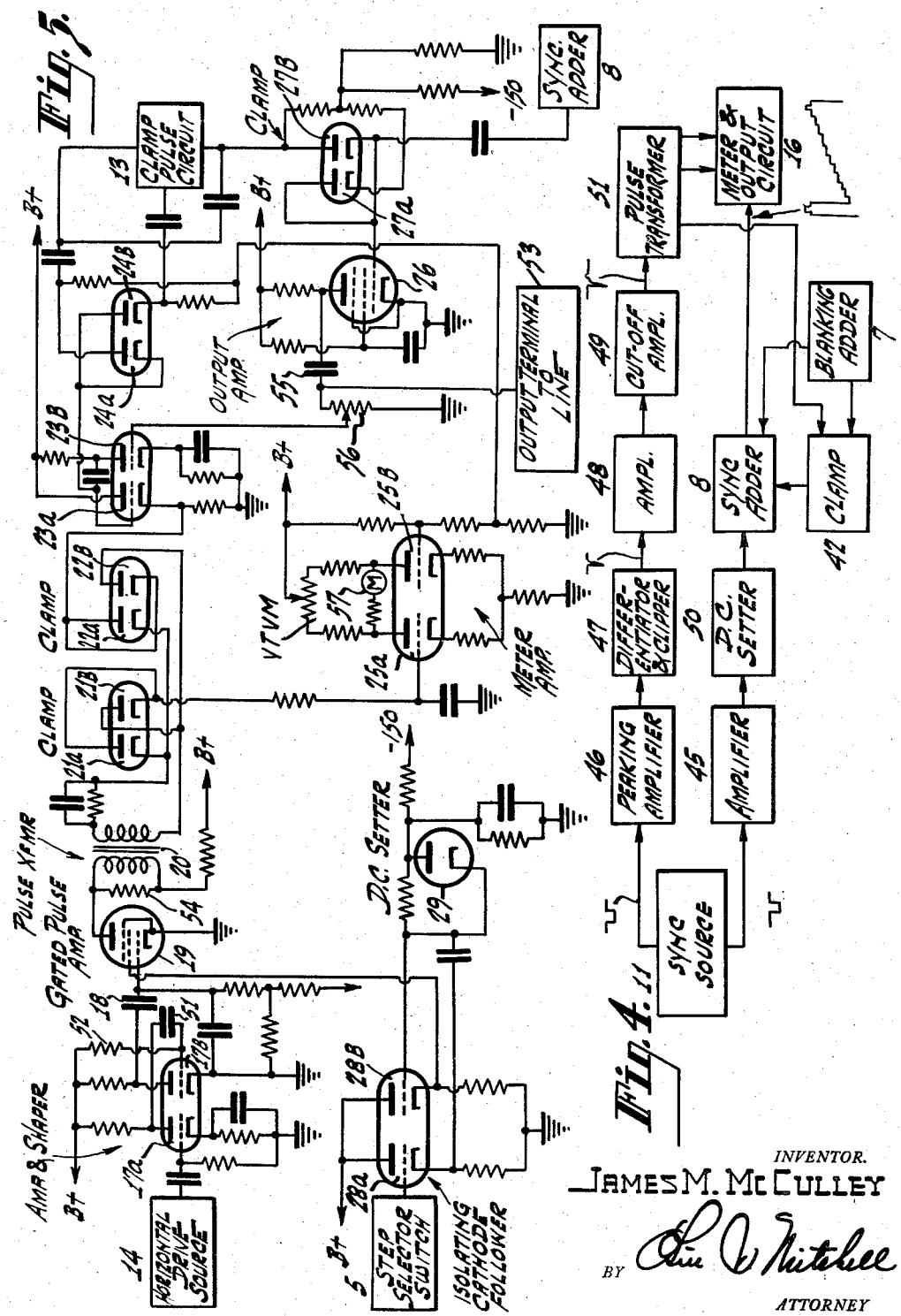

United States Patent Office 2,874,280
Patented Feb. 17, 1959

2,874,280

STEP-WAVE GENERATOR WITH MEANS TO ADJUST AND MEASURE HEIGHT OF ANY STEP

James M. McCulley, Barrington, N. J., assignor to Radio Corporation of America, a corporation of Delaware Application April 29, 1953, Serial No. 351,876

The terminal fifteen years of the term of the patent to be granted has been disclaimed 5 Claims. (Cl. 250—27)

This invention relates to apparatus for the production of test signals and more particularly to apparatus for the production of step waves mixed with sync and blanking signals for television purposes with provision for measuring the signal amplitude of any step.

For the testing of television transmitting and receiving systems it is desirable to have a signal of discrete voltage levels and having blanking and sync signals similar to those contained in the conventional composite video wave. This signal is extremely useful, for example, in measuring the linearity of video amplifiers as well as the linearity of the vertical deflection circuits. By the use of this apparatus, one can avoid, to a large degree, the introduction of spurious and extraneous signals, such as noise, or the effects of non-controllable factors that might be entailed if a television camera were employed with a test pattern, or a monoscope pattern was scanned and reproduced on a viewing screen.

Previous generators for the production of step waves have not provided means for individual, direct measurement of the voltage of each step generated. Usually the magnitude of the step is not adjustable independently. Furthermore, with known generators, there has usually existed some unwanted interaction between the steps generated if something was altered to affect any individual step.

With step-wave generators of the conventional type one can ascertain the characteristics of a circuit under test by passing the step-wave through the circuit and then attaching an appropriate display device such as a kinescope or cathode ray tube to the output. If the input wave had uniform increments between the voltages of each step, whereas the output bars on the display tube manifested non-uniform light levels, one could conclude that the test circuit response was inadequate. No direct measurement of the voltage of each step, or means for adjusting it was generally provided.

With the present invention one can feed the step wave to the test circuit which is coupled to a kinescope, for example, by placing a light meter in the area of the first bar and then consecutively on the succeeding bars one can adjust the voltage of each step until a uniform increment of light output for each step is obtained. By noting on the meter circuit the voltage of each step required to produce the uniform increment of light one can then plot the curve of voltage which should be the characteristic curve of a circuit producing the uniform light increment pattern.

In color television, where the so-called "luminance" or monochrome signal is composed of various percentages of the primary colors green, blue and red, it is often useful to generate a series of bars of one or more colors having varying intensities. The present invention provides a very flexible means for furnishing such test patterns.

According to this invention, two sets of pulses are derived from a vertical drive source, such as the deflection circuit of a kinescope. One set may synchronize an oscillator at 600 cycles per second, for example. The other set having a frequency or repetition rate which is a submultiple of the first set, as for example 60 cycles per second, synchronizes a ring of multivibrators in phase. The 600 cycles per second pulses are used to drive the stages of the multivibrator ring. The output pulses of each stage of the latter are combined to form a step wave, each of whose steps is independently adjustable in amplitude. Blanking signals are added, after having been clipped of all excess, to the step wave. Sync pulses are also added to the step wave to the degree desired and the entire composite step wave is then amplified before being fed to the output. A linear amplifier amplifies the composite step wave signal output slightly. The latter is then applied to a measuring circuit where the output step wave is first clamped to a reference voltage at blanking level during the back porch interval. It is then applied to a circuit where it is sampled during the interval of a particular step by a clamp which is keyed to operate during the occurrence of the particular step. A voltage is thus derived which represents the difference between blanking level and the voltage level of the particular step. This voltage is applied to a vacuum tube voltmeter which indicates the difference quantitatively.

Accordingly, it is an object of this invention to provide means for selectably measuring the amplitude of each and every particular step in a step wave.

It is a further object to provide a step-wave generator wherein each step is individually adjustable in magnitude by the operator.

It is a further object to provide a step-wave generator for television purposes wherein no harmful interaction between the steps occurs.

A still further object of the invention is to provide a step-wave generator with television sync and blanking signals added wherein the peak-to-peak amplitude of any step may be measured without interaction resulting from other steps.

These and other objects of the invention will become more apparent with reference to the drawings, in which:

Figure 1 is a block diagram of the over-all arrangement of the step-wave generator arranged in accordance with the teachings of this invention;

Figure 2 is a block diagram of the generator system for providing sync pulses of two different frequencies to the ring multivibrator which produces the step pulses;

Figure 3 is a detailed block diagram of the means according to this invention whereby blanking signals are generated and added to the step wave;

Figure 4 is a detailed block diagram illustrating how the sync pulses are added to the step wave and also depicting the circuit for the generation of clamp pulses which are applied at various points in the overall circuit; and Figure 5 is a circuit and block diagram showing details of the apparatus used to measure the amplitude of each step as it appears in the output circuit.

Referring to Figure 1, a source of vertical drive 1 provides an input to a 600 cycles per second ring sync pulse generator 2 where pulses of this frequency or repetition rate are produced. Simply for the purposes of explanation and illustration, the external sources of signals will hereinafter be assumed to furnish signals having negative polarity. The pulses are coupled to multivibrator ring 4 which consists of ten stages of conventional bistable multivibrators. The grids of nine stages of the multivibrator ring 4 are connected to the 600 cycle signal. The vertical drive source 1 also feeds a 60 cycles per second ring sync pulse generator 3 where differentiated spikes having a frequency of 60 cycles per second are produced and fed to the tenth stage of multivibrator ring 4. Each stage of the multivibrator ring 4 sets up the following stage so that the latter will be tripped with a sync pulse. The stage to which the 60 cycle signal is applied trips only when the 60 cycle pulse occurs and thus the ring is properly phased so that the bar which occurs during blanking interval will always be in the same location on the cathode ray tube or kinescope screen which may be used with this equipment.

The ring 4 is coupled to step selector switch 5 which consists of a push-button arrangement allowing selection of any desired step voltage from the plate of the multivibrator stage which produces that step. The outputs of each individual plate of the multivibrator ring 4 are fed to the corresponding grids of ten step mixers 6 which are cathode followers having all their cathodes in parallel. The basic step wave will thus appear at the common cathode connection as the sum of all the individual cathode follower outputs. A variable resistance is placed in the grid of each step mixer to vary the percentage of voltage from the multivibrator plate which is applied to the particular step mixer. Were a conventional resistance network used, a change in any one resistance so as to vary the height of a particular step would also affect all the other resistances, thereby also affecting the height of all other steps.

From a source of blanking pulses 9, a blanking pulse generator 10 furnishes a signal to one input of blanking adder 7; to the other input the composite step wave from the common output of the step mixers 6 is applied. From a source of sync signals 11, the sync adder circuit provides amplified sync pulses which are added in sync adder 8 to the mixed step wave and blanking signals appearing in the output of blanking adder 7. The output of sync adder 8 is then fed to the meter and output circuit 16.

The sync source 11 also is coupled to clamp pulse circuit 13 which generates three sets of output pulses, which are impressed at various points in the circuit, i. e., to a clamp circuit in the output circuit of blanking adder 7 and to two clamp circuits in meter and output circuit 16.

Horizontal drive source 14 provides gating pulses for gated pulse amplifier 15. Pulses derived from step selector switch 5 are also fed to gated amplifier 15. The output of amplifier 15 consists of clamp pulses which occur at a time corresponding to the occurrence of a desired step. In meter and output circuit 16, the step wave has its black level clamped to a certain D.-C. reference level and another circuit clamps on the particular step. The D.-C. output then will be the difference between the reference level and the clamp level for the step which will give a direct voltage reading of the amplitude of the step wave being measured on a meter contained in meter circuit 16.

Turning now to Figure 2, the operation of the generators for supplying pulses to the multivibrator ring 4 will be examined in more detail. Sixty-cycle vertical drive pulses from vertical drive source 1 are fed to a peaking amplifier 30 and the output signal is differentiated in conjunction with differentiator 31 which may be a conventional RC circuit. The negative peak of the differentiated wave is then suppressed by means of clipper 32, which may be a crystal diode, for example. The clipped wave is coupled to an isolating amplifier 33 whose output is used to synchronize an oscillator 34 such as a blocking oscillator having a 600 C. P. S. pulsed output. This wave is applied to nine stages of multivibrator ring 4.

A portion of the output of vertical drive source 1 is also applied to amplifier 35 and differentiated by means of a conventional RC circuit in differentiator 36. The differentiated signal is impressed upon amplifier 37 and thence applied to the tenth stage of multivibrator ring 4. This tenth stage will trip only at the time the 60 cycle pulse occurs, insuring the same location on the screen of the bar which occurs during blanking interval.

Figure 3 depicts details of the apparatus in which the blanking signals are added to the step wave. Signals from blanking source 9 are amplified in amplifier stage 38 and clipped in clipper stage 39. A diode may be coupled to amplifier 38 to serve as D.-C. setter 58 which establshes the intervals between blanking at ground potential. The output of clipper 39 is applied to a conventional limiter 40 which prevents high positive excursions at the plate of amplifier 38 when clipper 39 is non-conducting. This prevents possible transients from being coupled to the output through the ctahode-plate capacity of clipper 39. The clipped and limited blanking signal is applied to blanking adder 7 to which the step wave from step mixers 6 is also applied. The interval between blanking pulses may be established at a certain voltage level by means of D.-C. setter 59 which is coupled to blanking adder 7. The signal at the plate of blanking adder 7 is thus the sum of the step wave and the blanking signal. The amount of blanking that appears above the step wave level corresponding to blanking is removed by a series clipper 41. A voltage regulator 43 and a transient suppressor 44 may also be coupled to the latter stage. With a single triode used as the blanking adder circuit it is possible for the mixed blanking to be inadequate if a step is brought into the extreme white region. However, if a pair of pentodes is used as the blanking adder the increased output voltage would be such that the blanking would be adequate even in the extreme white region. Whatever choice of adder is made will largely depend upon the particular requirements of the design. The signal from clipper 41 is coupled to sync adder 8, blanking level being established by clamp 42.

Figure 4 details the operation of the circuit which adds sync signals to the composite step wave containing blanking signals and which also provides clamp pulses that are used at various points of the overall circuit to establish the D.-C. level at blanking level. Sync source 11 provides an input signal to amplifier 45, the interval between single pulses being established at a positive D.-C. level by D.-C. setter 50. The amplified sync is then added in sync adder 8 to the composite step wave containing blanking signals. The output of adder 8 is clamped at a certain voltage by clamp 42 and fed to the meter and output circuit 16.

Another portion of the signal output of sync source 11 is applied to amplifier 46 where it is peaked by means of an inductance in the plate circuit and a capacitor in the cathode circuit. The output of amplifier 46 is then coupled to a differentiating and clipping network 47 which may comprise an RC circuit and two diodes. Here the positive peak is suppressed and the negative peaks are amplified in amplifier 48 and applied to amplifier 49 which is biased beyond cut-off. The output slugs of current are passed through the primary of the pulse transformer 51. Negative and positive clamp pulses from the secondary of transformer 51 are applied to clamp 42 and to the meter and output circuit 16. Crystal diodes coupled to pulse transformer 51 may be inserted to help suppress the over-shoot excursion of the pulse transients.

It has been found that if the sync signal does not have a steep trailing edge, it is possible that the clamp circuits will function before the sync has entirely died away. To avoid this, a well defined sync signal should be used. To detect a too early operation of the clamp circuits, one can observe whether there is a shift in meter reading for the step as the sync level is changed. If the clamping occurs after the sync is complete, there will be no shift.

Figure 5 shows the circuitry which permits one to measure the height of each step directly upon a vacuum tube voltmeter. In this meter and output circuit it is desired to have a group of clamp pulses which occur at the same time that the desired step occurs. Horizontal drive signals are applied from source 14 to the grid of amplifier tube 17A whose plate is capacitively coupled to the control electrode of shaper tube 17B. At the grid of 17B the signal is differentiated and the positive going edge of the signal is greatly reduced because grid current is drawn. The grid of 17B is returned to B+ through high resistance 52 which may be of the order of 3.3 megohms, for example. The negative edge of the horizontal drive signal drives tube 17B beyond cutoff. The time constant of condenser 51 and resistor 52 is sufficiently long to insure that the pulse at the plate of tube 17B has the required duration. Delay is accomplished in the plate of tube 17B by condenser 18 so that the peak of the generated pulse occurs after the horizontal drive signal and the horizontal blanking signal. Tube 19 is a gated pulse amplifier to whose control electrode the delayed and shaped horizontal drive signal from tube 17B is applied by way of coupling condenser 18.

To the screen grid of the gated amplifier tube 19 a gating pulse from the multivibrator ring 4 is applied which is taken off push button step selector switch 5. This pulse is coupled to the grid of tube 28A which serves as an isolating cathode follower, whose output is applied to the control grid of tube 28B which is another cathode follower that drives the screen grid of tube 19. The push button switch 5 is arranged in such a way that should no push button be depressed the grid of tube 28A is returned to a negative voltage. This prevents the cathode-to-heater voltage from exceeding its rated voltage if the grid is not returned to ground. Tube 29 clamps the grid of tube 28B to a certain value of negative potential, for example, −28 volts. The positive excursion of the signal is determined by the voltage at the plate of the particular multivibrator stage in the multivibrator ring 4.

The plate of gated amplifier tube 19 is coupled to the primary of pulse transformer 20 across which a resistor 54 is placed for lowering the peak pulse voltage at the secondary and improving its waveform.

The step wave output including blanking and sync signals from sync adder 8 are coupled to output amplifier tube 26 whose blanking level is established at a small negative potential, for example, −2.7 volts, by clamp diode 27A. The output signal of amplifier tube 26 is then coupled to the line output terminal 53 through condenser 55.

The output of amplifier tube 26 is also coupled through variable resistor 56, which acts as a calibration control, to the input electrode of tube 23B where it is amplified sufficiently to permit calibration. The plate of tube 23B is coupled capacitively to the grid of cathode follower tube 23A. The D.-C. reference is established by clamp tubes 24A and 24B, which are coupled to clamp pulse circuit 13. Thus the step wave now has its blanking level clamped to a certain value of positive potential which may be of the order of 78 volts. Once this D.-C. reference has been established the four diode clamp circuit which comprises 21A, 21B, 22A and 22B, clamps the grid of meter amplifier triode 25A to the step level. Thus the voltage at the grid of tube 25A is a linear function of the difference between blanking and the desired step level. Tube 25B serves as a balancing triode and as part of a push-pull amplifier driving the meter 57, which may be 200 microamperes with unity full scale, so that the step level may be read. An input plug for the measuring circuit may be provided so that the step heights can be measured after the output of this step generator has been operated upon by external devices.

The zero control for the meter 57 is adjusted so that the meter reads zero when the push button step selector switch 5 is set on blanking step. The meter calibration control is then advanced so that the meter reads full scale with push button switch 5 set on white level step. The output gain control should not be changed once the meter has been calibrated.

An ordinary power supply may be used to furnish the requisite voltages for filaments and B+. Certain tubes require −150 volts for bias which may be obtained by a normal full wave rectifier having an RC filter. The regulation of the filter output may be accomplished by an appropriate voltage regulating tube, such as an OA2.

Although the step wave generator as described is designed to produce horizontal bars on the face of a kinescope it is easily adapted to produce vertical bars. This could be done in the same general way except that horizontal rather than vertical sync pulses would synchronize the multivibrator ring. Blanking and sync signals could be added in the same general way to produce an output waveform wherein the time duration between sync pulses would be H, i. e. 1/15,750 a second or 63.5 microseconds. The signal for each line would consist of 10 discrete steps instead of having all lines in the top tenth of the field at one step voltage and the succeeding lower tenths at voltages proportional to the amplitude of a corresponding step.

All clamping on the back porch of the blanking pulse would be accomplished in much the same way as the clamping for production of horizontal bars. As to the clamp operation on the particular step level desired for measurement purposes there would be a different arrangement. A gated pulse amplifier similar to tube 19 might be employed wherein the gating pulse fed to the screen would be supplied from the source of vertical blanking signals and the pulse passed to pulse transformer 20 through the gated pulse amplifier would be a voltage derived from the step selector switch 5. The gated amplifier would be turned on for the duration of an entire field but not during the vertical blanking interval.

It is thus seen that with this invention a very simple and exact direct reading of the peak-to-peak voltage of each step is provided. It is also seen that each step is adjustable in magnitude relative to the blanking level but there is no interaction between one step and another. This method of direct meter reading of the step height is accomplished by clamping the signal to a reference voltage at blanking level during the back porch interval and then clamping on the desired step once each line by clamp pulses. It affords much more accuracy than is possible by visual observation and thus discounts to a large extent human psychological and physiological phenomena. It also provides a method for measuring minute differences which would be almost imperceptible to the human eye.

Having thus described my invention, what is claimed is:

1. In a television testing system including a source of horizontal and vertical deflection signals, a source of blanking signals, a source of sync signals and a meter circuit, the combination comprising: multivibrator ring means coupled to said source of vertical deflection signals for producing a wave having a plurality of discrete voltage steps, means coupled to said multivibrator ring for selectively and individually varying the voltage level of each and every one of said discrete steps, means coupled to said blanking source for applying said blanking signals to said step wave, means coupled to said sync source for adding said sync signals to said step wave, and means coupled to said meter circuit for directly measuring selectively and individually the amplitude of each and every one of said discrete voltage steps, said meter circuit comprising first means for clamping said step wave containing said blanking signals to a reference voltage level, and second means coupled to said first clamping means for clamping said clamped step wave at the level of said step selected to be measured, said meter circuit thereupon being adapted to give a direct reading of the voltage difference between said reference level and said selected step level.

2. In a television testing system including a source of horizontal and vertical deflection signals, a source of blanking signals, a source of sync signals and a meter circuit, the combination comprising: multivibrator ring means coupled to said source of vertical deflection signals for producing a wave having a plurality of discrete voltage steps, means coupled to said multivibrator ring for selectively and individually varying the voltage level of each and every one of said discrete steps, means coupled to said blanking source for applying said blanking signals to said step wave, means coupled to said sync source for adding said sync signals to said step wave, and means coupled to said meter circuit for directly measuring selectively and individually the amplitude of each and every one of said discrete voltage steps, said meter circuit comprising means coupled to said horizontal deflection signal source for producing shaped signals in response to said horizontal signals, means coupled to said multivibrator ring for obtaining gate signals only during the occurrence of a selected step, gate means adapted to receive said shaped signals and said gate signals for producing keying pulses in response to the coincidence of said shaped signals and said gate signals, first clamping means coupled to said gate means, second clamping means coupled to said sync adding means for clamping said step wave containing said sync signals and said blanking signals to a reference voltage level, said first clamping means being keyed by said keying pulses to clamp said clamped step wave at the level of said selected step whereby a voltage representative of the difference between said reference level and the level of said selected step is derived, and meter means coupled to said first clamping mans for indicating the amount of said voltage difference.

3. In a television testing system, a source of vertical deflection signals, a source of horizontal deflection signals, a source of blanking signals, a source of sync signals, first means coupled to said vertical deflection signal source for producing a synchronizing signal having a frequency which is a multiple of that of said vertical signal source, second means coupled to said vertical deflection signal source for producing a second synchronizing signal having the same frequency as said vertical deflection signals, a multivibrator ring having a plurality of stages coupled to said first and second synchronizing signal generators, each stage of said multivibrator ring being adapted to produce one discrete level of voltage in response to said first and second synchronizing signals, said second synchronizing signals being operative to phase the production of said discrete voltage levels, means coupled to said ring for switching to any of said discrete voltage levels, a plurality of step mixers coupled to said switching means for combining said discrete levels of voltage into a step wave, means coupled to said step mixers and said blanking source for adding said blanking signals to said step wave, means coupled to said blanking adder means and to said sync source for adding said sync signals to said step wave containing said blanking signals, means coupled to said sync source and to said blanking adder means for deriving clamped pulses in response to said sync signals, said clamped pulses being adapted to establish a reference voltage level, gated pulse amplifier means coupled to said horizontal deflection signal source and to said switching means for deriving clamp pulses during the occurrence of a particular step of said step wave, and a meter and output circuit coupled to said gated pulse amplifier, said sync adding means and said reference level clamp pulse deriving means for directly reading the amplitude of said particular step.

4. In a test system for use in conjunction with a cathode ray tube display means having an electron beam which is deflected horizontally by signals of a certain frequency, the combination including: step wave generating apparatus having a plurality of means each of which produces a constituent step of said step wave, means adapted to receive said horizontal deflection signals for deriving pulses of said certain frequency, means switchably coupled to a selected one of said step producing means for deriving a gate signal corresponding to a selected constituent step, gate circuit means coupled to said pulse deriving means and to said gate signal deriving means, first means for clamping said step wave at a reference voltage level, second clamping means coupled to said gate circuit and to said first clamping means to clamp said clamped step wave at the level of said selected step whereby a voltage representative of the difference between said reference level and the level of said selected step is derived, and meter means coupled to said second clamping means for indicating the amount of said voltage difference.

5. In a test system for use in conjunction with a kinescope having an electron beam which is deflected horizontally by signals of a certain frequency, the combination including: step wave generating apparatus having a plurality of means each of which produces a constituent step of said step wave, means adapted to receive said horizontal deflection signals for producing pulses of said certain frequency, means including electron discharge means coupled to said plurality of step producing means for producing gate signals occurring during the interval of a selected step, gated pulse amplifier means coupled to said pulse producing means and to said gate signal producing means for producing keying pulses during the occurrence of said selected step, pulse transformer means coupled to said gated pulse amplifier means, first clamping means coupled to said step wave producing means for clamping said step wave at a reference voltage level, second clamping means coupled to said pulse transformer means for applying said keying pulses thereto to clamp said clamped step wave at the level of said selected step in response to said keying pulses, means coupled to said first and second clamping means for deriving a voltage representative of the difference between said reference level and the level of said selected step, vacuum tube volt meter means coupled to said last-named means for indicating said voltage difference.

References Cited in the file of this patent

UNITED STATES PATENTS

| | | |
|---|---|---|
| 2,307,275 | Blumlein | Jan. 5, 1943 |
| 2,495,168 | Houghton | Jan. 17, 1950 |
| 2,496,338 | Barton | Feb. 7, 1950 |
| 2,527,967 | Schrader | Oct. 31, 1950 |
| 2,591,738 | Spencer | Apr. 8, 1952 |
| 2,624,770 | Yetter | Jan. 6, 1953 |
| 2,660,676 | Doba et al. | Nov. 24, 1953 |
| 2,668,188 | Naslund | Feb. 2, 1954 |
| 2,714,704 | Morrison | Aug. 2, 1955 |
| 2,733,433 | Morrison | Jan. 31, 1956 |
| 2,742,525 | Larky et al. | Apr. 17, 1956 |
| 2,792,496 | Rhodes | May 14, 1957 |